United States Patent [19]

Horneys et al.

[11] 4,239,275
[45] Dec. 16, 1980

[54] VEHICLE TRANSPORTER

[75] Inventors: David C. Horneys, Shippensburg; Gerald L. Pool, Greencastle, both of Pa.

[73] Assignee: Jerr-Dan Corporation, Greencastle, Pa.

[21] Appl. No.: 17,199

[22] Filed: Mar. 5, 1979

[51] Int. Cl.³ .............................................. B60J 9/00
[52] U.S. Cl. ..................................... 414/478; 410/26; 414/558
[58] Field of Search .................... 296/1 A; 105/368 R

[56] References Cited
U.S. PATENT DOCUMENTS 2,765,938  10/1956  Di Addezio ........................ 296/1 A
3,100,124  8/1963  Demos ................................. 296/1 A Primary Examiner—John J. Love
Assistant Examiner—John A. Carroll
Attorney, Agent, or Firm—Brady, O'Boyle & Gates

[57] ABSTRACT

A standard truck chassis has a common support on the rear end of its main frame for a lower extensible and retractable vehicle deck and for a lower deck stabilizer unit which is also employed to tilt the lower deck following its rearward extension. Another support rising from the chassis main frame behind the truck cab pivotally supports the forward end of an upper vehicle deck positioned over the lower deck and the rear end of an over-cab vehicle deck. Power devices are provided to tilt the upper vehicle deck and the over-cab deck at proper times during vehicle loading and unloading operations. Three vehicles can be carried bodily on the three decks of the transporter and a fourth vehicle can be towed by the stabilizer unit.

16 Claims, 23 Drawing Figures

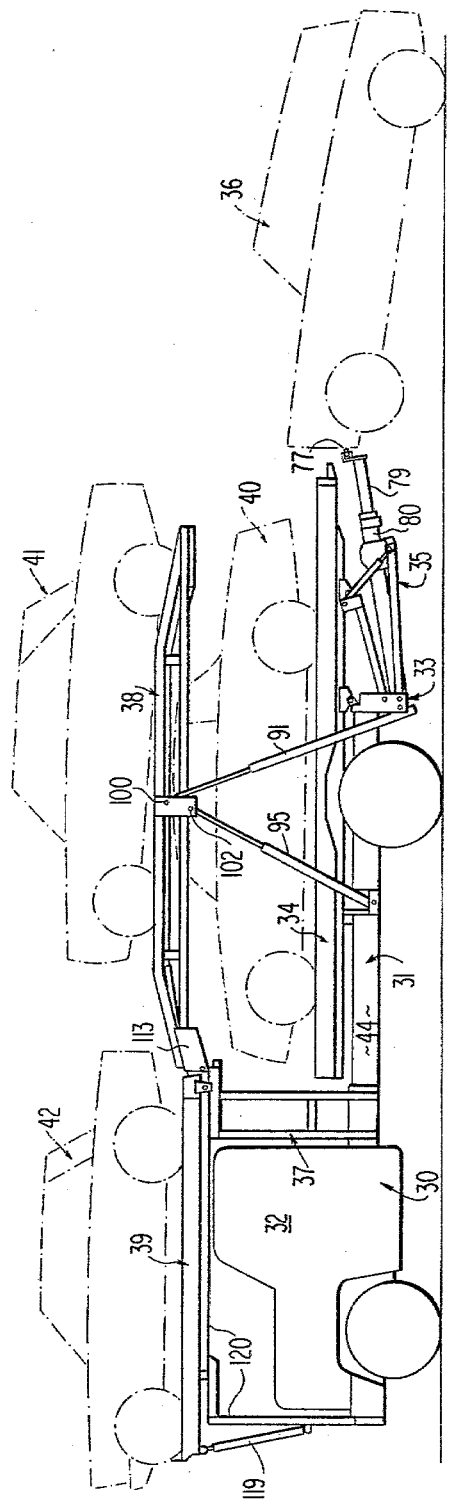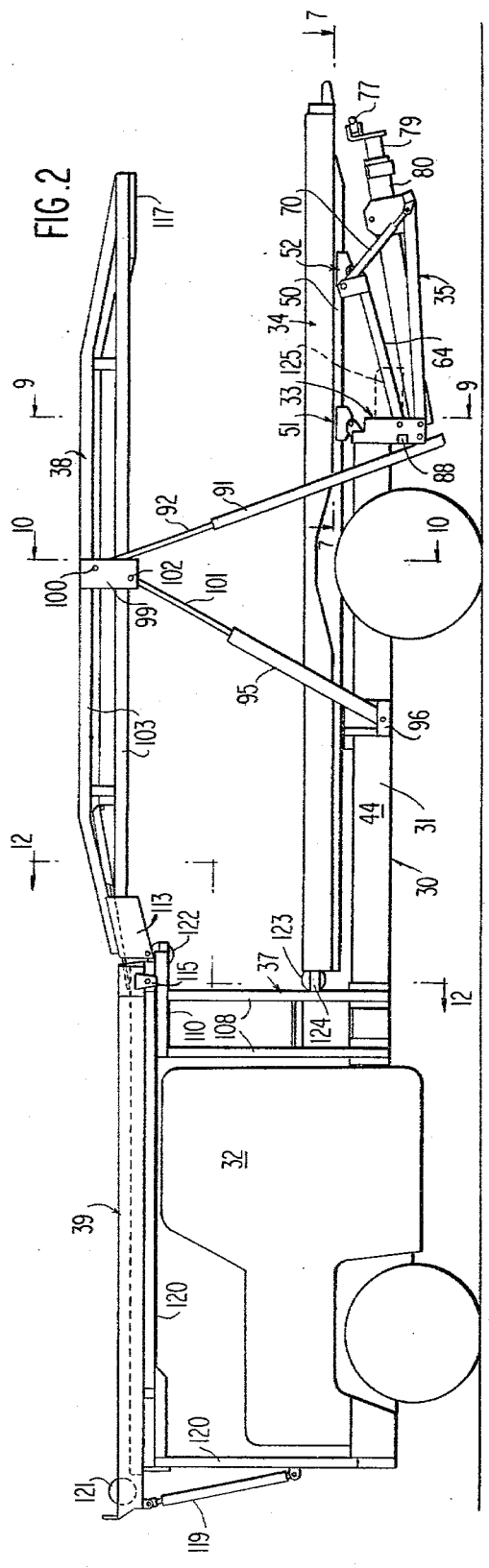

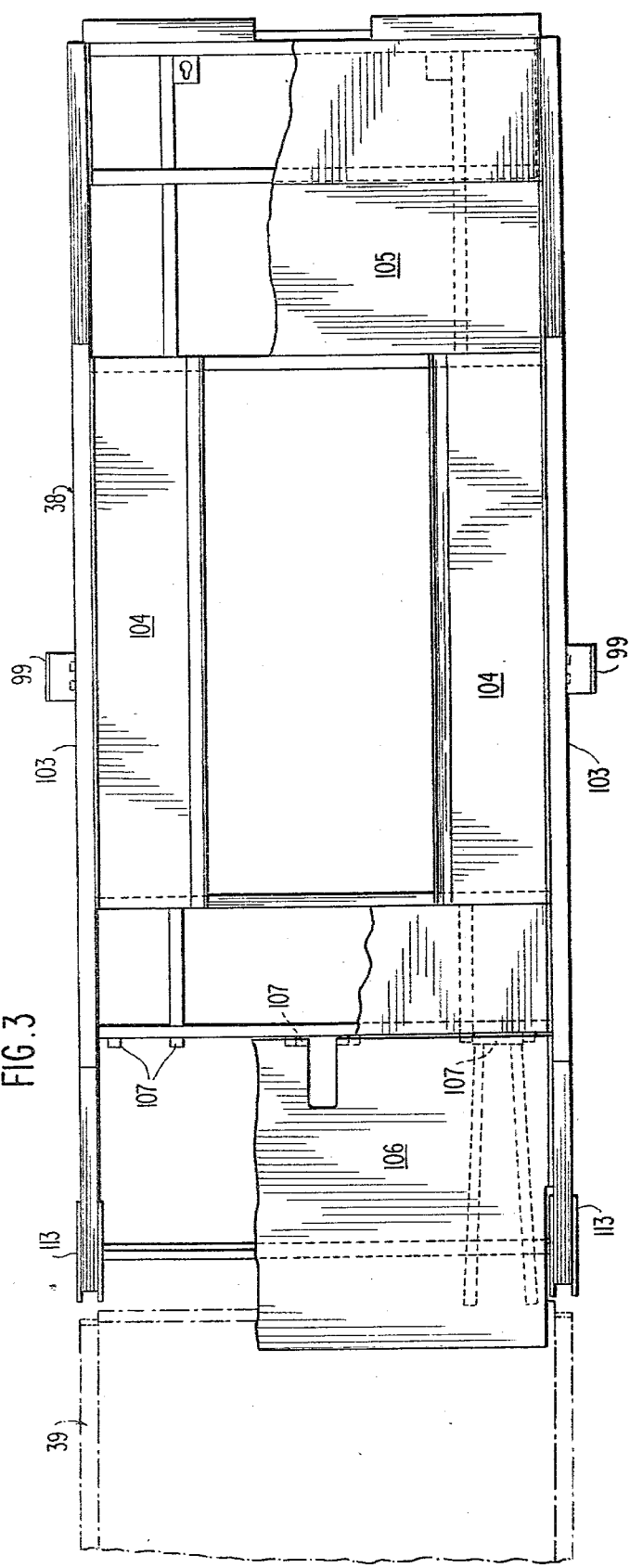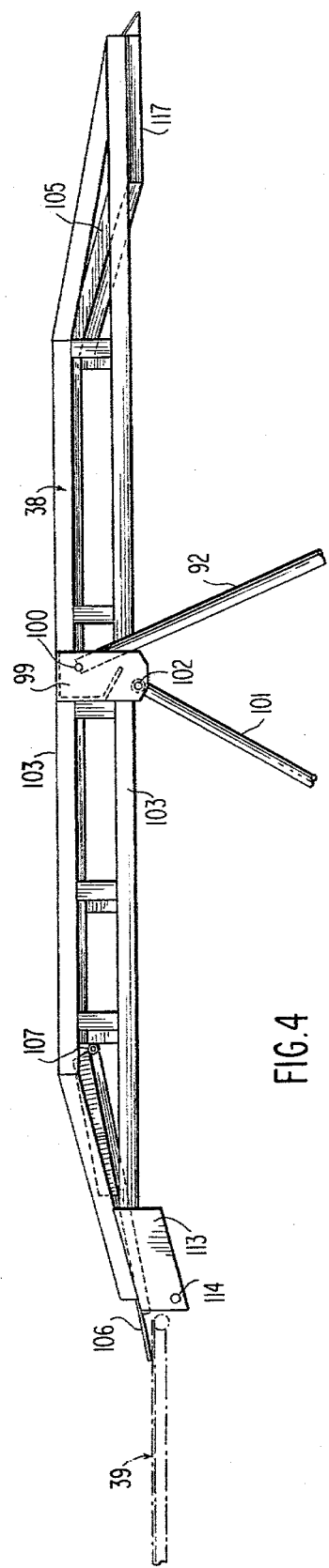
FIG. 3
FIG. 4

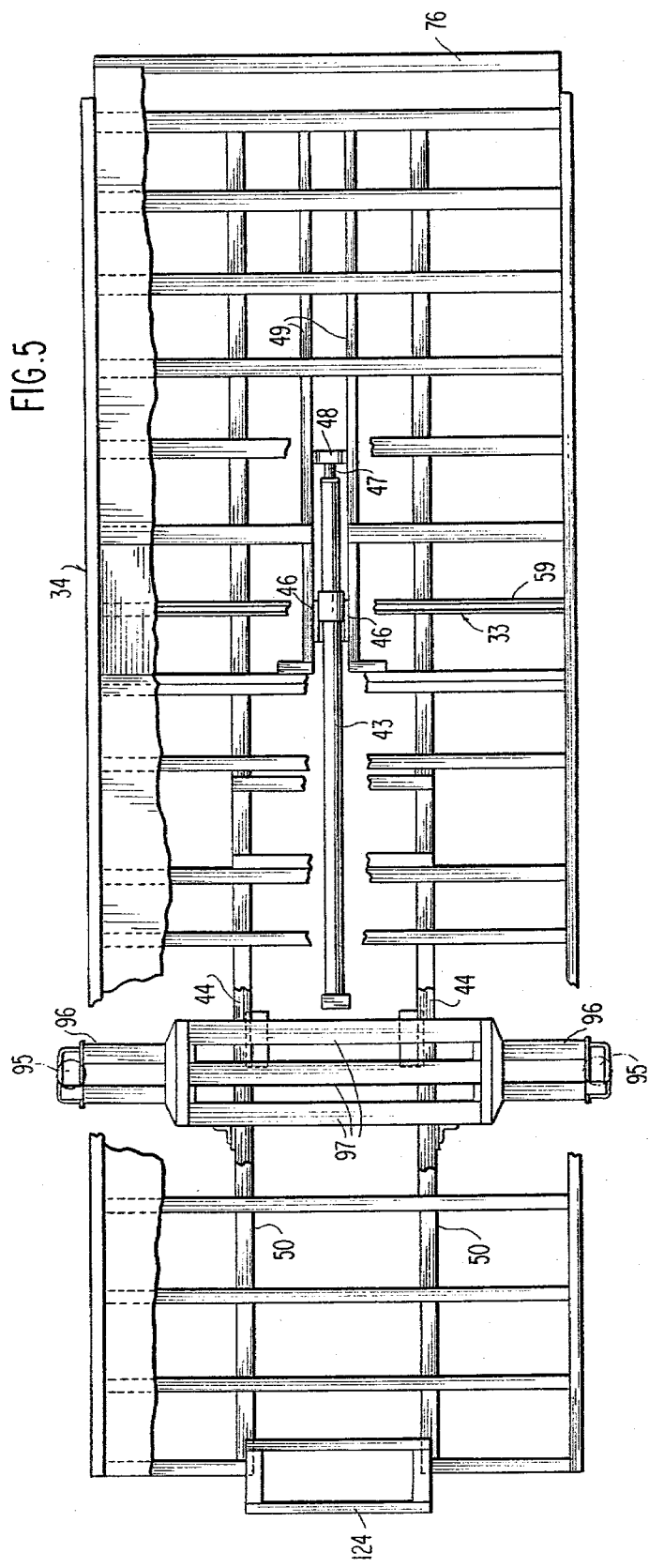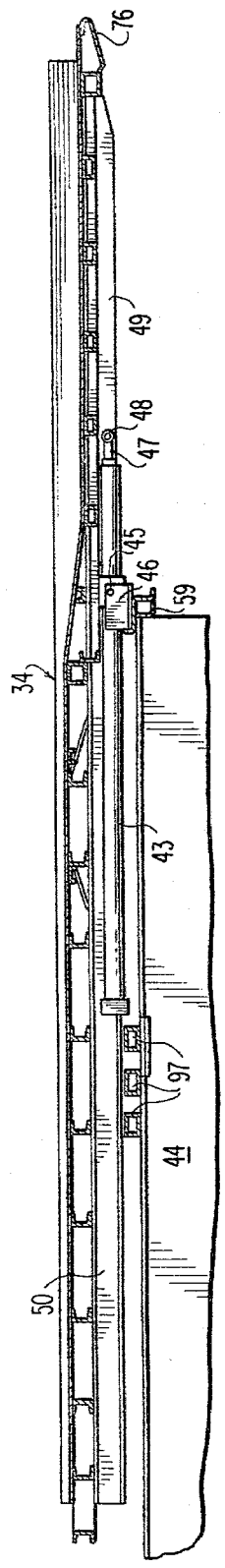

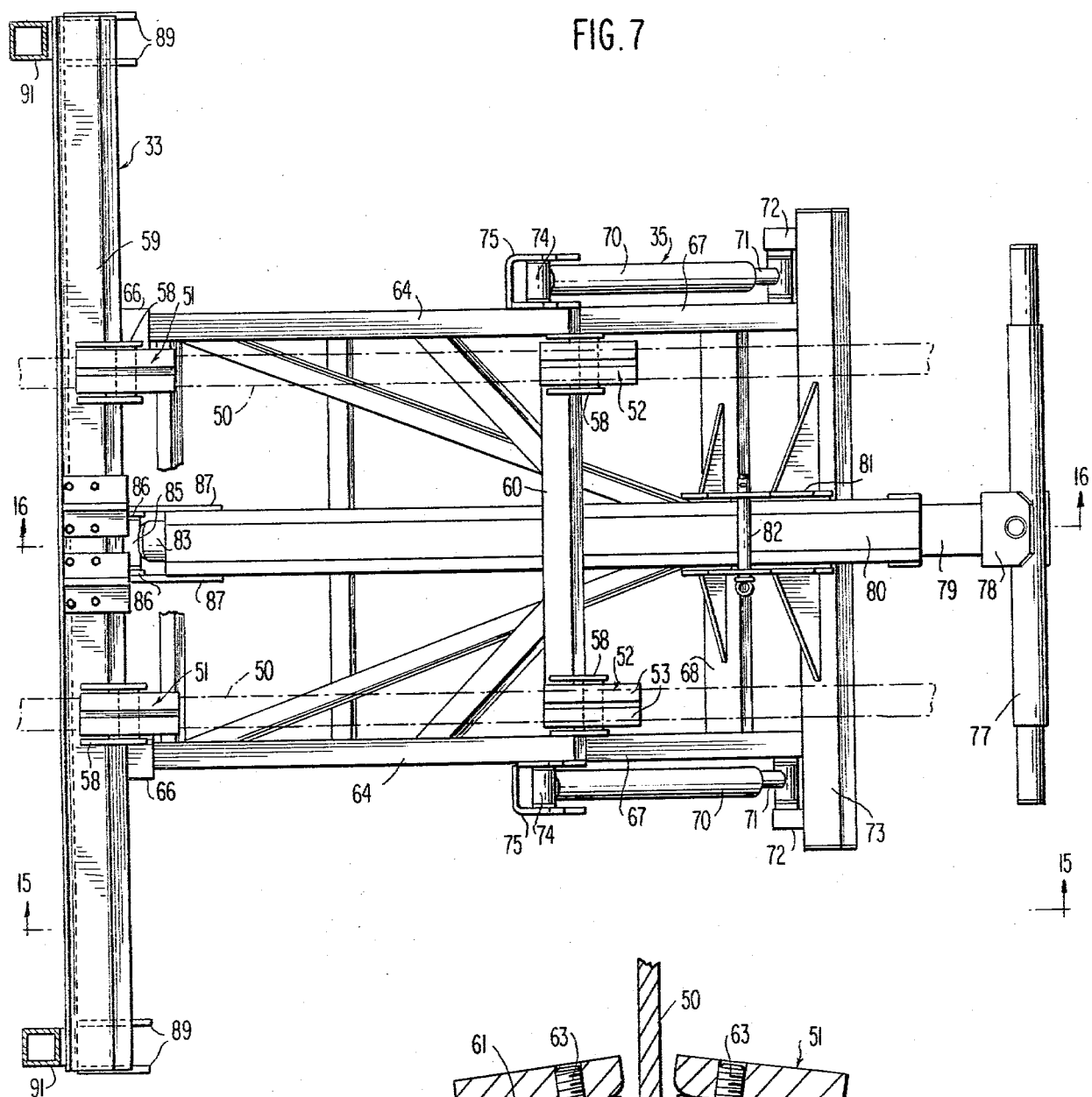
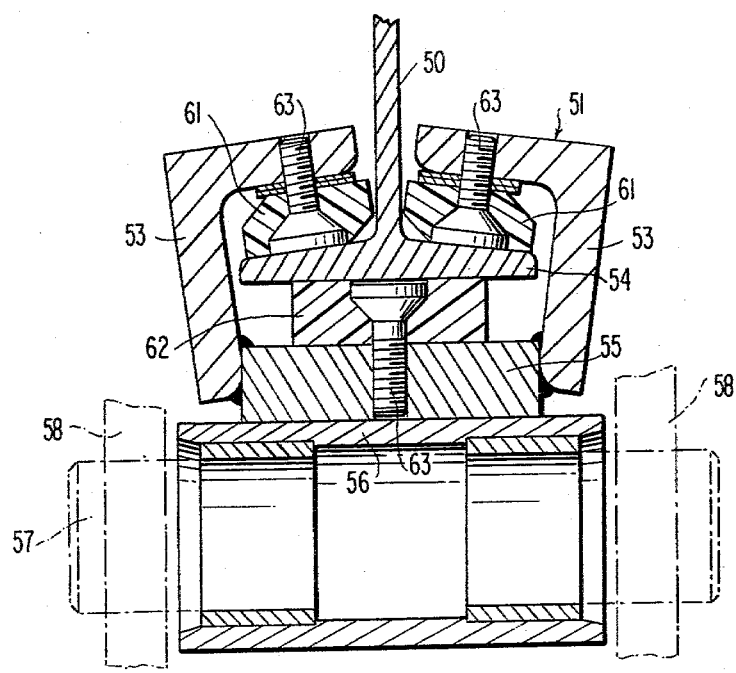

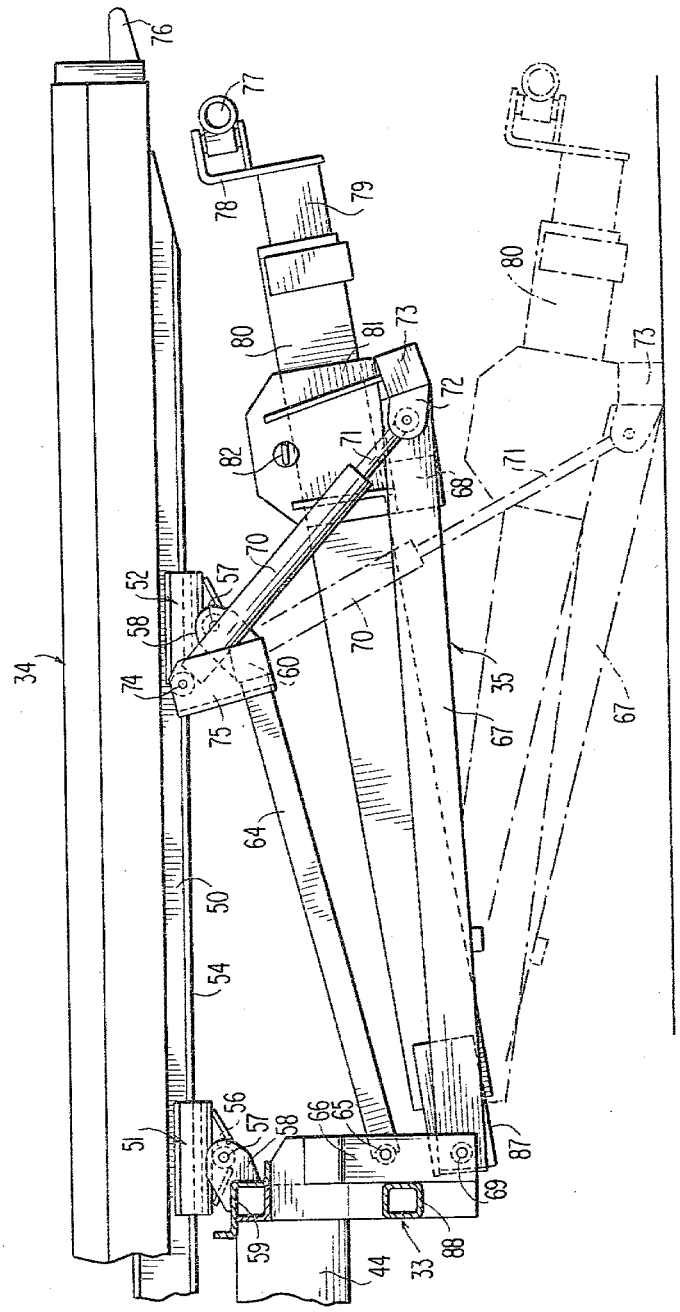
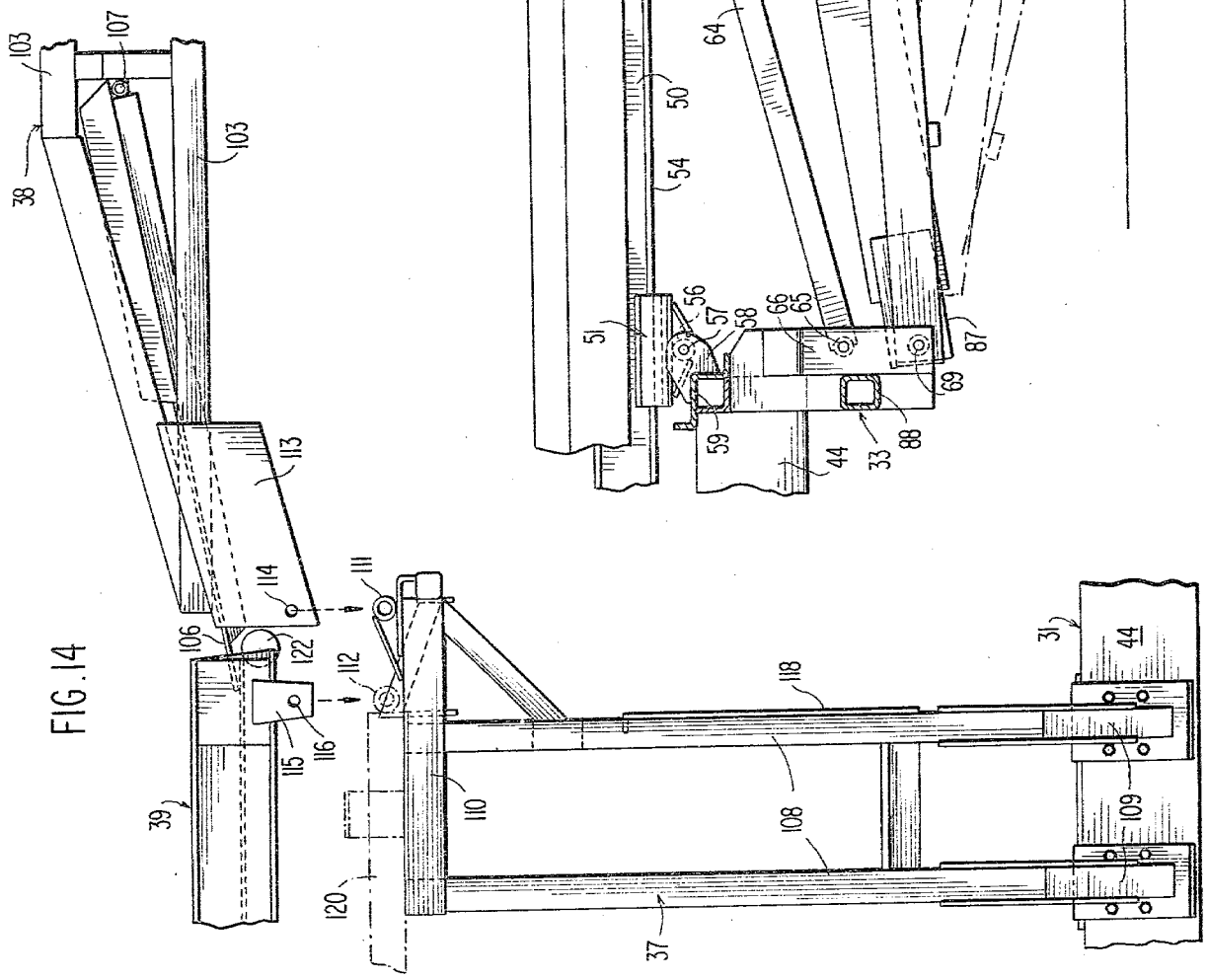

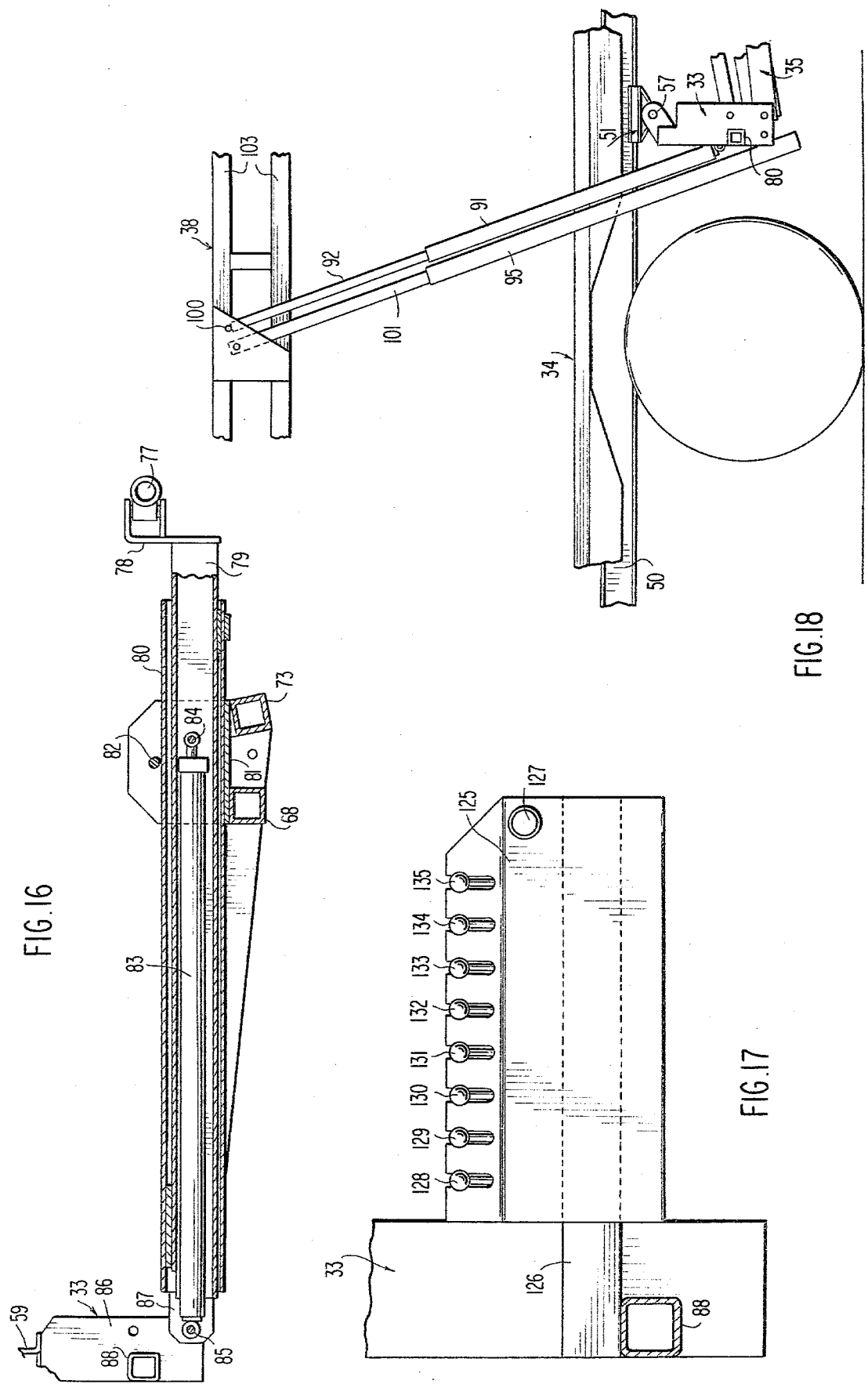

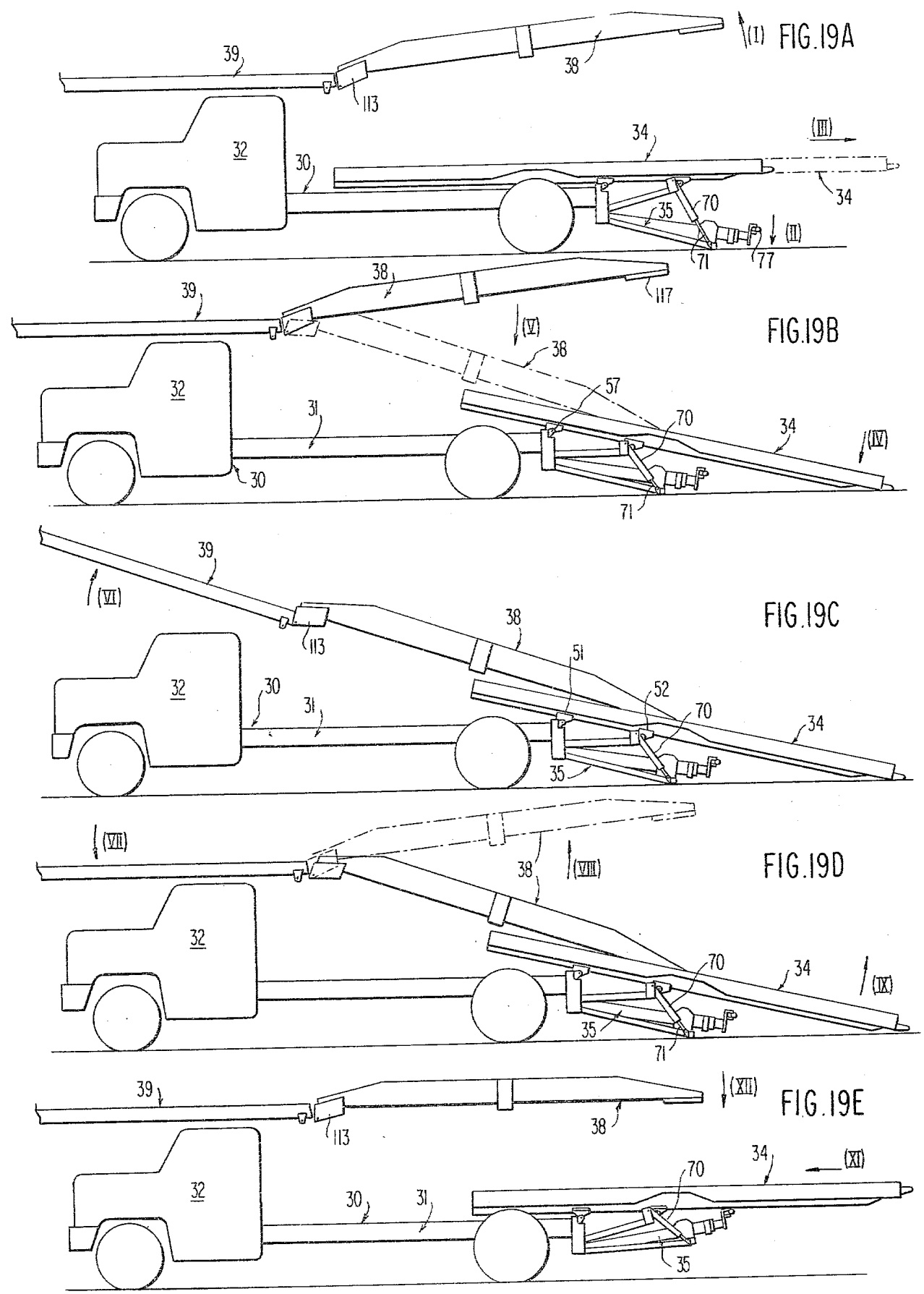

VEHICLE TRANSPORTER

BACKGROUND OF THE INVENTION

Vehicle transporters in the form of motor trucks having multiple decks are well known in the prior art. Most of these transporters are in the nature of trailer units to be towed by truck tractors having the well-known fifth wheel means to couple with the trailer. Generally, the prior art transporters for new automobiles have the capacity to transport six or eight vehicles from the factory to local dealerships. These transporters are specially constructed for this purpose and are very expensive, and as stated above are used in conjunction with a separate fifth wheel towing truck unit.

Some other types of vehicle transporters are known in the prior art for carrying a lesser number of vehicles, but here again either a specialized transporter must be constructed from the ground up or the transporter will be severely limited in the number of vehicles it can carry.

With the above limitations in mind, it is the objective of this invention to provide a simplified, economical and very practical transporter for vehicles having the capability of transporting up to four automobiles or other vehicles and having for its mobile base a standard type short frame truck chassis including forward cab which is readily available on the automotive market. Utilizing this standard type truck chassis, the present invention is realized merely by adding thereto a support structure at the rear end of the chassis main frame which is common to a lower extensible, retractable and tilting vehicle deck and a stabilizer device for such deck which is also used to tilt the lower deck following its rearward extension. A second support structure on the chassis main frame closely behind the cab forms the common pivotal support for the forward end of a tiltable upper vehicle deck overlying the lower deck and the rear end of a tiltable over-cab vehicle deck extending forwardly from the upper deck, power means being provided to raise and lower the upper deck and the over-cab deck, when required, to facilitate the loading and unloading of vehicles.

Basically, therefore, the invention is embodied in relatively simple attachment components for a comparatively low cost readily available standard truck chassis. The resulting transporter enables a short frame truck chassis to transport up to three automobiles with ease and in a manner whereby the caravan complies with all state and Federal highway regulations as to length, width and height. The transporter is safe, durably constructed and increases the vehicle transporting capacity of the standard type truck chassis far beyond anything heretofore contemplated.

Other objects and advantages of the invention will become apparent during the course of the following detailed description.

BRIEF DESCRIPTION OF THE DRAWINGS

FIG. 1 is a side elevation of a vehicle transporter according to the invention and illustrating the transporting of four vehicles.

FIG. 2 is an enlarged side elevation of the vehicle transporter in an empty condition.

FIG. 3 is a fragmentary plan view of the transporter partly broken away and parts omitted.

FIG. 4 is a side elevational view of the components in FIG. 3.

FIG. 5 is a plan view of the lower vehicle deck, partly broken away, and associated elements.

FIG. 6 is a side elevation of the lower vehicle deck.

FIG. 7 is a horizontal section taken substantially on line 7—7 of FIG. 2.

FIG. 8 is an enlarged fragmentary vertical section taken through a slide bearing arrangement for the lower vehicle deck.

FIG. 14 is an enlarged fragmentary side elevation of the support structure and pivots for the upper deck and over-cab deck of the transporter.

FIG. 15 is an enlarged fragmentary side elevation of the lower deck stabilizer and tilting unit and associated parts.

FIG. 16 is a fragmentary central vertical longitudinal section through an extensible and retractable towing device incorporated in the stabilizer unit.

FIG. 17 is a fragmentary side elevation of a control box for the transporter.

FIG. 18 is a fragmentary side elevation showing a modified form of tilting and locking means for the upper vehicle deck.

FIGS. 19A through 19E are diagrammatic side elevational views of the transporter showing a sequence of operations involved in loading the same with vehicles.

DETAILED DESCRIPTION

Figure 9:
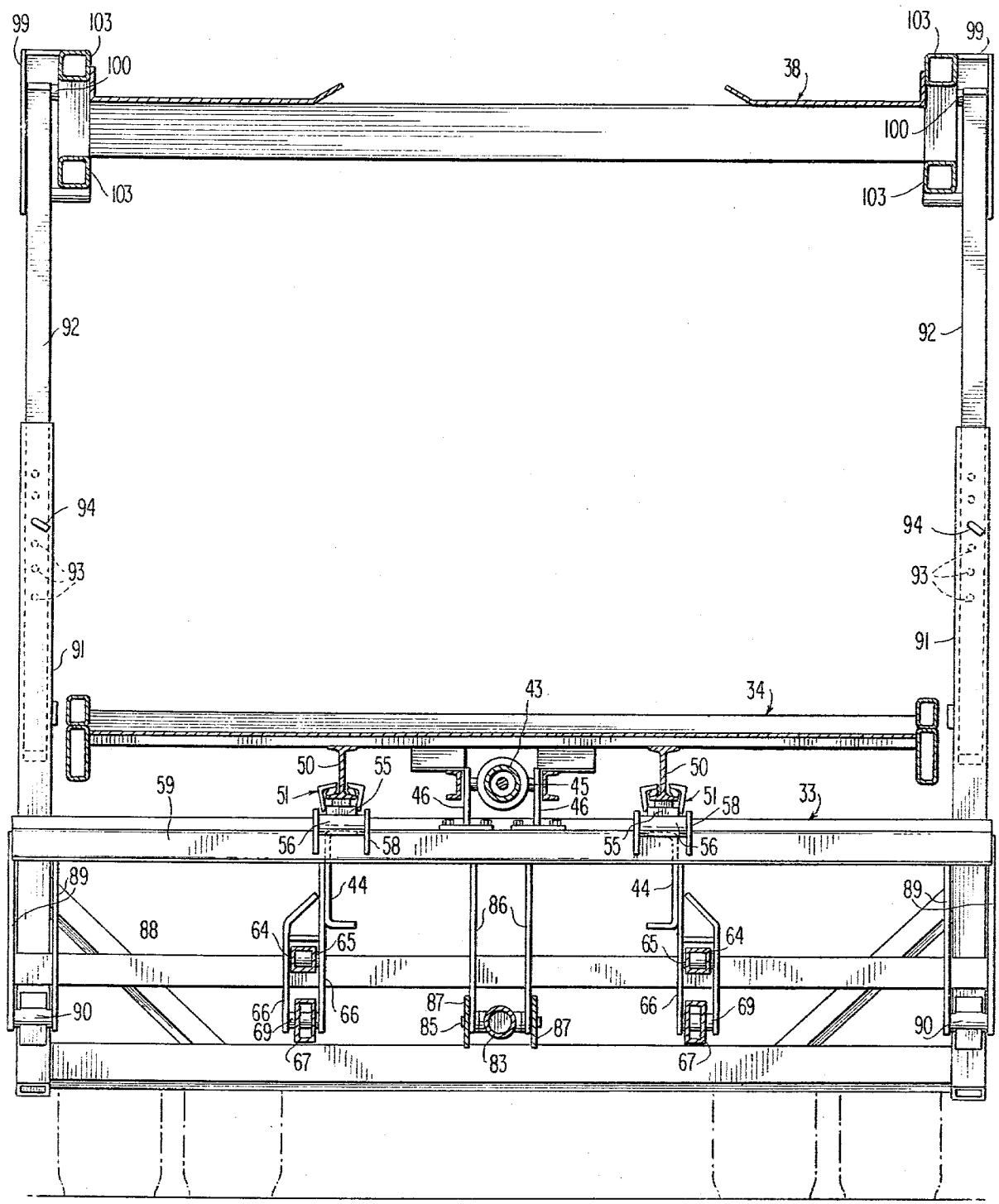
FIG. 9 is an enlarged transverse vertical section taken on line 9—9 of FIG. 2.

Referring to the drawings in detail wherein like numerals designate like parts, and referring initially to FIG. 1, a standard type truck chassis 30 includes a comparatively short main frame 31 and a driver's cab 32. This standard truck chassis forms the mobile base for the vehicle transporter embodying the invention. Fixed to the rear end of the chassis main frame 31 is a common support structure 33 for a lower vehicle deck 34 and an underlying lower deck stabilizing and tilting unit 35 which is also employed to tow a trailing vehicle 36.

Rearwardly of the cab 32, a rigid support structure 37 rises from the chassis main frame 31 and forms the common pivotal support for an upper vehicle deck 38 above the lower deck 34 and for an over-cab vehicle deck 39 forwardly of the deck 38 at generally the same elevation. As will be further described, the forward end of the upper deck 38 and the rearward end of the over-cab deck 39 are pivoted to the support structure 38 on transverse horizontal axis pivots so that the two decks may be tilted about their pivot axes at proper times by power means, to be described. Vehicles 40, 41 and 42 are bodily carried and transported on the three decks 34, 38 and 39, giving the transporter a capacity of four vehicles, as illustrated in FIG. 1.

Referring to the other drawing figures, the lower deck 34 of the transporter is horizontally extensible rearwardly and retractable forwardly under influence of a single longitudinal power cylinder 43 at the center of the transporter and slightly above the side rails 44 of the chassis main frame 31, FIG. 9. The power cylinder 43 is supported on trunnions 45 held in spaced brackets 46 which are fixed to the top cross member 59 of the transverse support structure 33. The rod 47 of cylinder 43 is coupled at 48 between a pair of longitudinal members 49, FIGS. 5 and 6, which are parts of the lower deck 34.

During its horizontal longitudinal movements, spaced parallel I-beam rails 50 on the bottom of the deck 34 are slidingly engaged with and guided by fore and aft pairs of low friction bearings 51 and 52, the details of which bearings are shown in FIG. 8. The pairs of slide bearings 51 and 52 are associated with the stabilizer assembly or unit 35, as shown in FIG. 15. Each slide bearing, FIG. 8, comprises a pair of opposing angle bar sections 53 on opposite sides of the bottom flange 54 of the adjacent I-beam rail 50 and welded to a support block 55 below the flange 54, the block 55 being secured to a sleeve 56 which can swivel or pivot on a fixed pin 57. Each pin 57 is secured to an ear 58 on a cross member 59 of common support structure 33, FIG. 15, or a like cross member 60 of the stabilizing and tilting unit 35, FIG. 7. The slide bearings 51 may therefore pivot on the axes of the pins 57 as required during the operation of the lower deck 34, which will be further described.

Each bearing 51 and 52 further comprises a pair of low friction upper bearing pads 61 on top of rail flange 54, and a lower bearing pad 62 below this rail flange. The bearing pads 61 and 62 are secured by screws 63, FIG. 8.

The stabilizing assembly or unit 35 associated with the lower deck 34 comprises an upper frame 64 which includes the cross member 60 and having the rear ends of its sides pivoted at 65 to vertical plates 66 which form elements of the support structure 33. The stabilizing unit 35 further includes a lower frame 67 including a cross member 68 and the two longitudinal sides of the lower frame also have corresponding ends pivoted as at 69 to the same plate members 66, FIGS. 9 and 15. Power cylinders 70 on the stabilizer unit 35 have their rods 71 pivotally coupled to lugs 72 of another cross bar 73 parallel to the cross member 68 and also integrated with the lower frame 67. The remote ends of the two cylinders 70 are pivotally coupled at 74 to brackets 75 attached to the upper frame 64 of the unit 35.

Prior to rearward extension of the lower deck 34 by power cylinder 43 to the position indicated in dotted lines in FIG. 19A, the rods 71 of cylinder 70 are extended to the position shown in FIGS. 15 and 19A which is the stabilizing position for the unit 35 wherein the cross bar 73 bears upon the ground. With the stabilizing unit thus activated to give support to the lower deck 34, the same can be extended horizontally rearwardly by the cylinder 43 to the position shown in dotted lines in FIG. 19A. Following this, and with the lower deck having its center of gravity well beyond its tilt axis, the rods 71 are retracted while the cross bar 73 remains in contact with the ground and this causes safe and controlled tilting of the lower deck 34 to the inclined position shown in FIG. 19B, wherein a rear end bar 76 of the lower deck 34 will engage the ground. Subsequent extension of the rods 71 will return the lower deck 34 to the level position prior to its forward retraction. The operation of the lower deck and stabilizing unit 35 will be further discussed in terms of the overall operation of the transporter.

The unit 35 also carries a transverse towing bar 77 for the trailing vehicle 36, FIG. 1. This towing bar is carried by a bracket 78 attached to an inner telescoping boom section 79 extending longitudinally at the transverse center of the unit 35 and engaging within an outer relatively stationary tubular boom section 80 slidably supported on a saddle 81 and restrained against upward displacement by a retainer pin 82 held in apertured side plates of the saddle 81, FIGS. 7, 15 and 16. This arrangement allows relative sliding movement between boom section 80 and the saddle 81 which forms a part of the lower frame 67 during vertical swinging movement of the latter, as shown in FIG. 15.

Within the interior boom section 79 is a power cylinder 83 having its extensible and retractable rod coupled at 84 to the boom section 79 and having the far end of its cylinder body pivotally connected at 85 to vertical plates 86, FIG. 9, of the support structure 33. The adjacent end of the outer boom section 80 has suspension plates 87 secured to opposite sides thereof and being pivotally supported on the pivot element 85. The arrangement enables the telescoping boom for the towing bar 77 to rise and fall with the lower frame 67 of the stabilizing unit 35 by pivoting about the axis of pivot element 85 which is coaxial with the pivots 69. With the rods 71 of cylinders 70 extended sufficiently to allow the towing bar 77 to clear the rear end of lower deck 34, the rod of cylinder 83 can be extended rearwardly to position the towing bar for lifting and towing the vehicle 36, FIG. 1, in conjunction with conventional coupling equipment, not shown. When the rod of cylinder 83 is extended, the interior boom section 79 carrying the towing bar is simultaneously extended.

Except for the addition of the described towing means for the vehicle 36, the stabilizing unit 35 for the lower vehicle deck 34 is basically shown in U.S. Pat. No. 3,430,792 to D. L. Grove et al. The horizontal extension of the lower deck 34, while the stabilizing unit 35 is supporting it followed by the tilting of the lower deck under control of cylinder 70 around the axes of the pivot pins 67 adjacent to bearings 51, corresponds essentially to the operation of the vehicle bed in U.S. Pat. No. 3,430,792.

The support structure 33 additionally comprises a lower cross brace 88 below and parallel to the cross member 59 and extending outwardly beyond the sides of the lower deck 34, FIG. 9. Additional vertical plates 89 of the support structure 33 rigid with the cross members 59 and 88 pivotally support at 90, FIG. 9, the lower ends of square cross section brace tubes 91 which receive telescopically therein adjustable brace bars 92 which are apertured at 93 to selectively receive removable locking pins 94 held in openings of the tubes 91. As shown in FIG. 9 and elsewhere, the two adjustable braces or supports for the upper deck 38 consisting of tubes 91 and bars 92 lie outside of the lower deck 34 to provide clearance for the same, and this is the reason that the transverse support structure 33 is extended beyond the sides of the lower deck.

Figure 10:
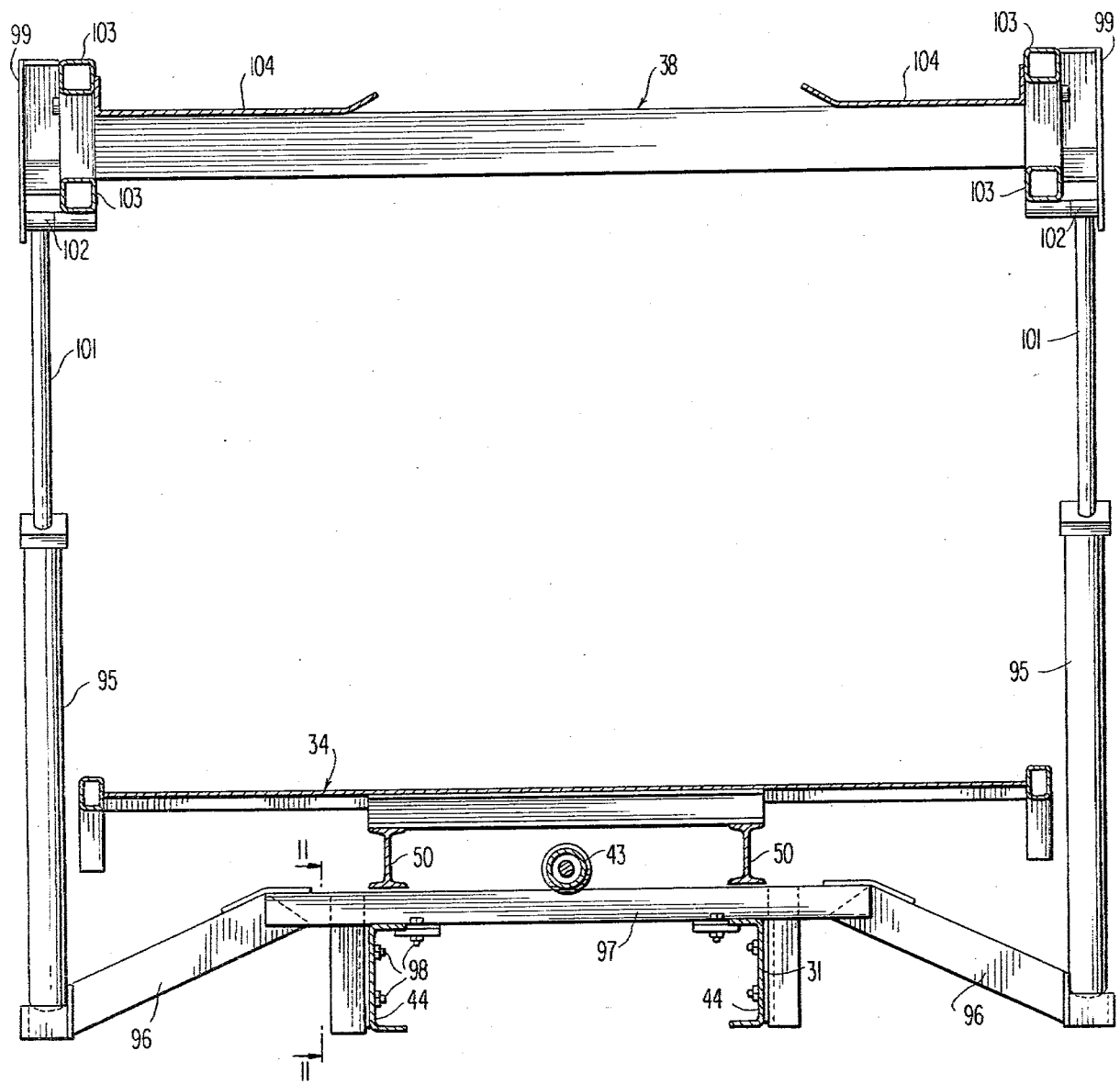
FIG. 10 is a similar section taken on line 10—10 of FIG. 2.

A pair of cooperative raising and lowering power cylinders 95 for the upper deck 38 similarly have their lower ends pivotally supported on side inclined support arms 96 carried by a transverse horizontal frame consisting of three bars 97 rigid therewith and in turn being fixedly secured as at 98 to the chassis frame members 44. As shown in FIG. 10, the bars 97 of the fixed transverse support lie closely beneath the movable rails 50 of lower vehicle deck 34.

The previously-mentioned upper vehicle deck 38 of the transporter has side brackets 99 near its longitudinal center to which the tops of brace bars 92 are pivotally attached at 100. Similarly, the rods 101 of power cylinders 95 are pivotally connected at 102 to the brackets 99.

The upper deck 38 has truss-like side frames consisting of vertically spaced horizontal members 103 to which the side brackets 99 are secured rigidly. As shown in FIG. 10, the truss-like side frames render the upper deck rigid and allow the roof of the vehicle 40 on the lower deck to project upwardly between the side frames consisting of members 103 with the vehicle wheel supporting deck plates 104, FIG. 10, overlying the vehicle roof. This particular construction of the upper deck 38 helps to reduce the overall height of the caravan so that bridge clearance requirements may be met.

For the same reason, the upper deck has a rearward inclined entrance ramp 105 and a forward inclined exit ramp 106 leading toward the over-cab vehicle deck 39, FIG. 14. The forward ramp 106 is a vertically swingable plate member having its rear edge hinged as at 107 to the forward end of the more elevated horizontal portion of the upper deck.

Figure 12:
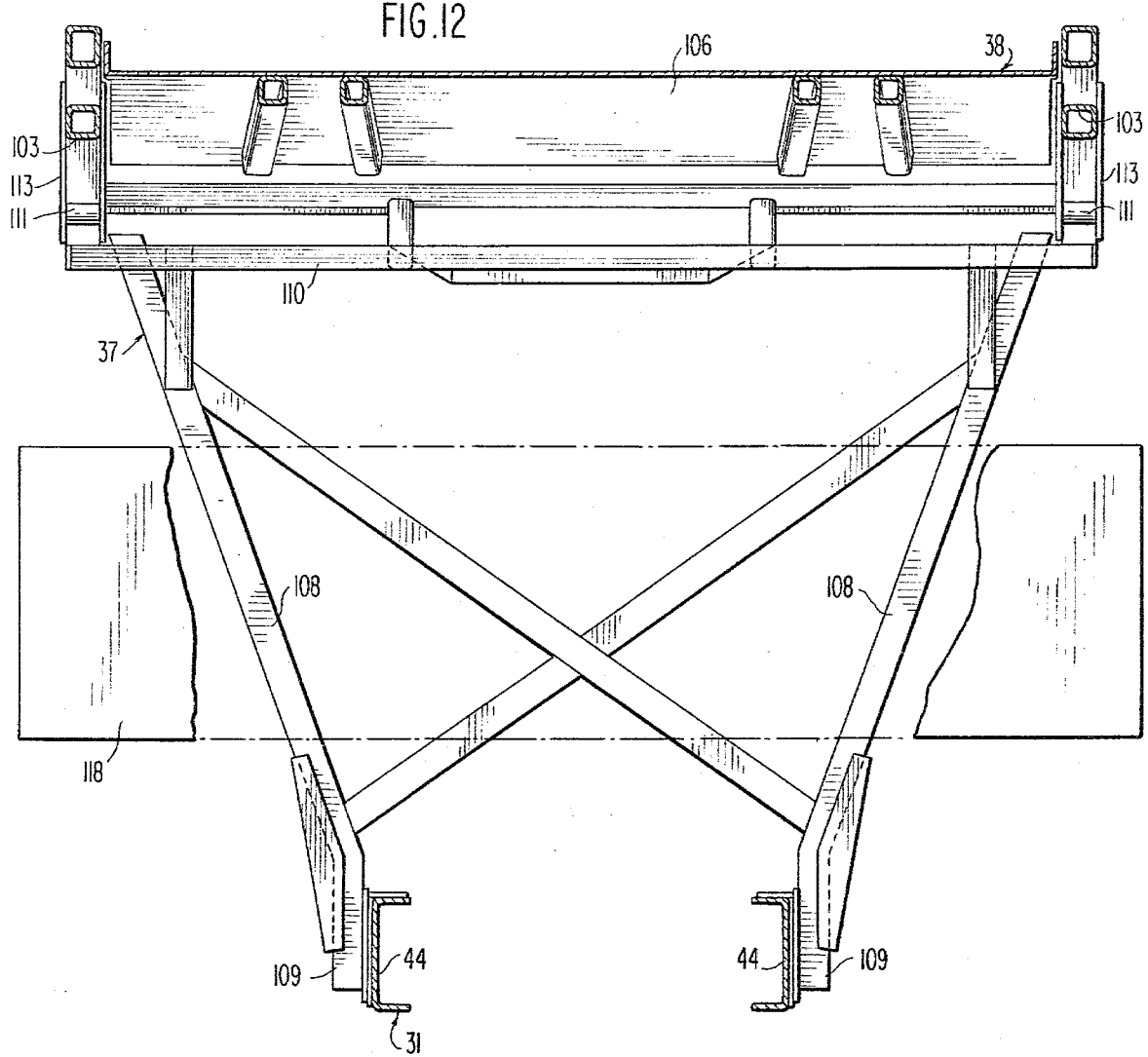
FIG. 12 is a transverse vertical section taken on line 12—12 of FIG. 2.
Figure 13:
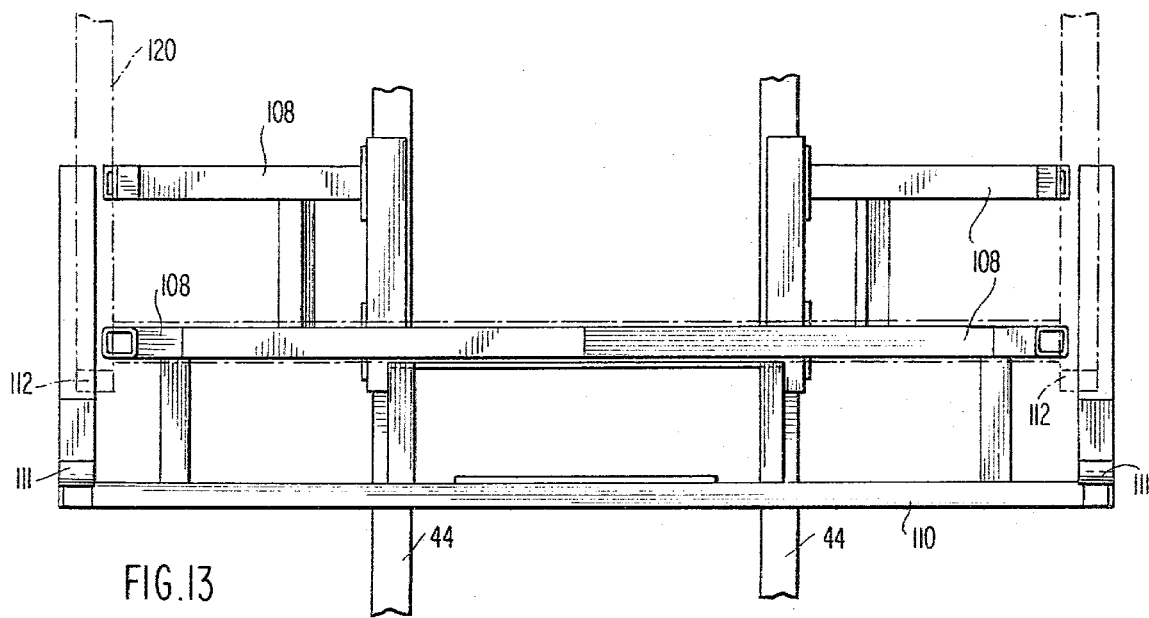
FIG. 13 is a fragmentary plan view of the structure in FIG. 12.

The previously-noted support structure 37 behind the cab 32 depicted in FIGS. 12 through 14 in some detail comprises upwardly diverging side members 108 having their lower vertical end portions 109 fixedly secured to the outer sides of chassis frame rails 44. The tops of members 108 are rigid with and support a horizontal transverse support frame 110 carrying one pair of hinge knuckles 111 for the forward end of the upper deck 38 and a second pair of hinge knuckles 112 somewhat forwardly of the knuckles 111 for the rear end of the over-cab deck 39. Side plates 113 on the forward end of upper deck 38 have pivot apertures 114 which receive transverse axis pivot pins also engaging through the knuckles 111. Similarly, rear side plates 115 on the over-cab deck 39 have pivot apertures 116, FIG. 14, receiving transverse axis pivot pins which also engage through the knuckles 112. In this manner, the forward end of the upper deck 38 is pivotally connected to the top of support structure 37 and the rear end of over-cab deck 39 is pivotally connected to the support structure 37 immediately ahead of the pivot for deck 38. As shown in FIGS. 3, 4 and 14, the hinged ramp 106 of upper deck 38 slightly overlaps the rear of deck 39 to provide a smooth transition for vehicles.

It may now be understood that, by extending and retracting the rods 101 of cylinders 95, the rear end of upper deck 38 can be swung vertically between an elevated position, FIG. 19A, through a depressed position, FIG. 19C, or an intermediate level position, FIGS. 1, 2 and 19E. In any adjusted position of the pivoted upper deck 38, it may be securely locked rigidly by the selective placement of the locking pins 94 in the spaced apertures 93 of the two adjustable side braces composed of elements 91 and 92. When the upper deck 38 is fully depressed as in FIGS. 19C and 19D, its rear end plate 117 will rest on the lower deck 34 and will be firmly supported thereby without reliance on the locking pins 94. However, these locking pins are required to support the deck 38 in both its level and elevated positions, FIGS. 2 and 19A.

A safety buffer plate 118 on the rear of support structure 37, FIGS. 12 and 14, protects the cab 32 in case of an accident.

The raising and lowering of the over-cab deck 39 on its pivot axis 116 is accomplished by a pair of forward power cylinders 119 connected between the forward end of deck 39 and the supporting framework 120 which underlies the deck 39 and is tied into the top of support structure 37 to form a complete frame around the cab 32.

Each of the three decks 34, 38 and 39 is equipped with an independently operable cable winch for moving inoperable or junk vehicles onto and off of the transporter. While the transporter is useful in connection with new vehicles, it fills a particular need for transporting used and/or junk vehicles in a much more efficient, practical and economical manner than has heretofore been possible with existing, rather makeshift, equipment.

The cable winch for the over-cab deck 39 is indicated at 121 at the forward end of such deck. The winch for the upper deck 38 is schematically indicated at 122, FIGS. 2 and 14, and the winch for the lower deck 34 is shown at 123 on a forward extension 124 of the lower deck. The three winches may be conventional.

It may also be noted that the engine of truck chassis 30 operates a suitable power take-off shaft, not shown, which drives a pump, not shown, to energize hydraulic fluid from a suitable reservoir, not shown, to operate the various power cylinders of the transporter. These components are all conventional and need not be illustrated in the drawings.

FIG. 17 shows a control box or unit 125 for the hydraulic cylinders of the transporter and its several winches. The control unit also shown in FIG. 2 schematically is supported on one side of the support structure 33 through a mounting arm 126 and is in ready reach of an attendant standing in a safe position near one side of the transporter.

The control unit includes an auxiliary throttle control knob 127 to regulate the truck chassis engine which drives the pump or pumps. A power take-off control knob is provided in the truck cab 32 to engage or disengage the power take-off shaft which operates the pump. Additionally, on the control unit 125, a control knob or handle 128 for the cylinders 70 of stabilizing unit 35 is provided, also a knob 129 for the control of the movement cylinder 43 for lower deck 34; a lower deck winch control knob 130; a knob 131 to control the cylinders 119 which tilt the over-cab deck 39; another knob 132 for the control of the winch 121; upper deck tilt control knob 133 regulating cylinders 95; a knob 134 for the control of upper deck winch 122; and finally a knob or handle 135 for the tow bar operating cylinder 83. Suitable local controls of a conventional type may also be located on each winch. The controls operated by the several knobs of the unit 125 are conventional and need not be described or illustrated for a proper understanding of the invention.

Figure 11:
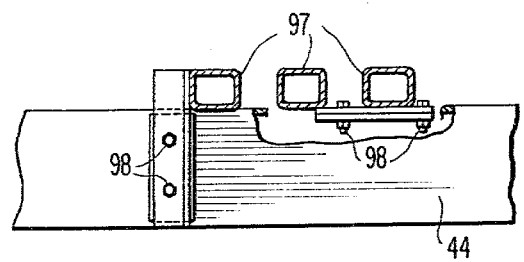
FIG. 11 is a fragmentary vertical section taken on line 11—11 of FIG. 10.

FIG. 18 shows a modification of the invention which differs from the described embodiment only in the relocation of power cylinder 95 and its rod 101 from the position shown previously. The arrangement shown in FIG. 2 requires a separate transverse support structure for the lower ends of cylinders 95 including arms 96 and bars 97 and associated elements, FIGS. 5, 10 and 11. Such support means is eliminated entirely by the modification where the cylinder 95–101 is arranged closely parallel to the adjustable brace 91–92, FIG. 18. The lower end of each cylinder 95 of the modified arrangement is pivotally connected to the common support 33, thus simplifying the overall structure even further, and reducing its cost of manufacturing. The operation of the cylinder 95 for raising and lowering the upper deck 38 and the operation of the brace 91-92 is basically the same as described previously.

SUMMARY OF OPERATION

Diagrammatic FIGS. 19A through 19E, taken with FIGS. 1 and 2, show the sequence of operations involved in loading the transporter with vehicles. Assuming that the transporter is initially arranged as in FIG. 2 with the stabilizer unit 35 up, the towing bar 77 retracted, the lower deck 34 forward and level, and the decks 38 and 39 level, the steps designated by numerals I through XII in FIGS. 19A through 19E are carried out.

More particularly, FIG. 19A, upper deck 38 is raised by cylinders 95 and braced or locked by pins 94, FIG. 9. Stabilizer assembly 35 is lowered into contact with the ground by means of cylinders 70. Lower deck 34 is shifted horizontally rearwardly by cylinder 43 and is supported by the stabilizer unit against tilting.

In FIG. 19B, the rods 71 of cylinders 70 are retracted to produce gravity-assisted tilting of the lower deck 34 on its main pivot axis 57 to the ground-engaging inclined position shown. Next, the upper deck 38 is unlocked and swung downwardly by retraction of piston rods 101, FIG. 2, and the rear plate 117 of the upper deck can rest solidly on the lower deck to form a two-part inclined ramp for vehicles. The braces 91 and 92 need not be pin locked at this time as the decks 38 and 34 are stably supported.

Referring to FIG. 19C, the over-cab deck 39 is now raised by cylinders 119 and held in an inclined position to form a three-part continuous vehicle ramp. A first vehicle is now driven up the three-part ramp onto the deck 39, following which the deck 39 is lowered to the level position shown in FIG. 19D. Following this, a second vehicle, namely the vehicle 41 of FIG. 1, is driven up onto the inclined upper deck 38 and suitably anchored by conventional means. Next, the loaded upper deck 38 is elevated by the cylinders 95 to the fully raised position shown in broken lines, FIG. 19D, and locked by the pins 94 of adjustable braces 91-92.

Following this, the third vehicle 40, FIG. 1, is driven onto the inclined deck 34 and anchored and the deck 34 is then returned to the level position shown in broken lines in FIG. 19A by again extending the rods 71. The lower deck 34, now level, FIG. 19E, is shifted horizontally forwardly by cylinder 43 and the stabilizing unit 35 is elevated by its cylinders 70 so that the transporter loaded with vehicles 42, 41 and 40 is returned to its original condition of adjustment depicted in FIG. 2.

If a fourth vehicle 36 is to be transported, the unit 35 is lowered sufficiently for the towing bar 77 to clear the back of lower deck 34 and the towing bar can be extended toward the fourth vehicle, not shown, by extension of the rod of cylinder 83. Prior to extending the towing bar 77 toward the fourth vehicle parked behind the transporter, the unit 35 is adjusted downwardly to position the towing bar 77 at the proper elevation beneath the front of the fourth vehicle. After hitching the fourth vehicle 36 to the bar 77 by conventional means, the unit 35 is raised to lift the front of the vehicle 36 to the final roadway towing position shown in FIG. 1. Reverse procedures are followed for unloading the transporter and such reverse procedures need not be described.

If disabled or junk vehicles are being loaded or unloaded, the three winches 121, 122 and 123 will be employed in proper sequence.

The terms and expressions which have been employed herein are used as terms of description and not of limitation, and there is no intention, in the use of such terms and expressions, of excluding any equivalents of the features shown and described or portions thereof but it is recognized that various modifications are possible within the scope of the invention claimed.

We claim:

1. A vehicle transporter comprising a mobile support having a normally level frame, a horizontally extensible and retractable lower deck on said frame and being tiltable to an inclined position relative to said frame following horizontal extension of the lower deck, an adjustable ground-engaging stabilizing means on said frame to support the lower deck during its horizontal extension and to allow tilting of the lower deck to said inclined position following said extension, a support structure rising from said frame to an elevation substantially above the lower deck, an upper deck above the lower deck and having its forward end pivoted to said support structure, power means interconnecting said frame and upper deck and operable to elevate the upper deck to an inclined position above the pivotal connection of the upper deck with said support structure and also operable to lower the upper deck to an inclined position below said pivotal connection, whereby the rear end of the upper deck may rest upon and be supported by the lower deck when the latter is in its inclined position, the lower and upper decks then forming a substantially continuous inclined ramp for vehicles.

2. A vehicle transporter as defined in claim 1, and longitudinally adjustable and lockable brace means interconnecting said frame and upper deck rearwardly of said pivotal connection and operable to support the upper deck rigidly while level or while inclined above said pivotal connection.

3. A vehicle transporter as defined in claim 1, and another deck on said vehicle transporter forwardly of said upper deck and at approximately the elevation of the upper deck and having a rear end pivotally connected to said support structure, and additional power means interconnecting said frame and said another deck and operable to elevate the last-named deck to an inclined position above the pivotal connection of the last-named deck with said support structure, whereby the last-named deck, upper deck and lower deck can form a substantially continuous inclined ramp for vehicles.

4. A vehicle transporter as defined in claim 3, and a control unit on the vehicle transporter accessible to an operator near one side of the transporter for controlling the movements of all of said decks and said stabilizing means in a required sequence.

5. A vehicle transporter as defined in claim 1, and a power-operated longitudinally extensible and retractable lifting and towing mechanism for a vehicle on said stabilizing means, the stabilizing means including power lifting means.

6. A vehicle transporter as defined in claim 1, and power means interconnecting said frame and said lower deck and operable to extend and retract the lower deck horizontally.

7. A vehicle transporter as defined in claim 1, and a transverse support structure on said frame near the rear end thereof and forming a common support for said stabilizing means and for the fulcrum of said lower deck.

8. A vehicle transporter as defined in claim 1, and said mobile support comprising a motor truck chassis, said normally level frame comprising the main frame of said chassis.

9. A vehicle transporter as defined in claim 8, and said lower and upper decks each having a length to receive and support one automobile, and said chassis main frame beneath said lower deck being of lesser length than the lower deck, said stabilizing means being supported on the rear of said main frame and lying beneath the rear end portion of the lower deck when the lower deck is horizontally retracted.

10. A vehicle transporter as defined in claim 2, and a transverse support structure on the rear end of said frame and forming a common support for the fulcrum of the lower deck, said stabilizing means and said adjustable and lockable brace means.

11. A vehicle transporter as defined in claim 1, and longitudinal guide rails on the bottom of said lower deck, and spaced pairs of self-adjusting slide bearings for said guide rails on the rear of said frame and on said stabilizing means.

12. A vehicle transporter as defined in claim 10, and a second transverse support structure on said frame forwardly of the first-named transverse support structure and extending laterally outwardly of the side edges of said lower deck and forming the base support of said power means, said power means comprising a pair of extensible and retractable power cylinders.

13. A vehicle transporter as defined in claim 2, and a single transverse support structure on the rear of said frame and having end portions projecting laterally outwardly of the side edges of said lower deck, and said end portions of the transverse support structure commonly supporting said power means and said adjustable and lockable brace means.

14. A vehicle transporter as defined in claim 13, and said power means consisting of a pair of extensible and retractable power cylinders, and said brace means consisting of a pair of extensible and retractable braces having rigid adjustable locking means to lock the braces in a plurality of length adjusted positions.

15. A vehicle transporter as defined in claim 3, and said first-named and additional power means comprising extensible and retractable power cylinders, and another extensible and retractable power cylinder coupled between said frame and said lower deck to extend and retract the lower deck horizontally.

16. A vehicle transporter as defined in claim 15, and said stabilizing means including power cylinder raising and lowering means coupled between the stabilizing means and said lower deck, and a control unit on the vehicle transporter having selectively operable control elements for all of said power cylinders and said power cylinder raising and lowering means.

* * * * *